US012046790B2

(12) United States Patent
Göttl et al.

(10) Patent No.: US 12,046,790 B2
(45) Date of Patent: Jul. 23, 2024

(54) PHASE SHIFTER MODULE COMPRISING A DEVICE FOR PHYSICALLY SEPARATING A PHASE SHIFTER FROM A MATCHING DEVICE WHILE ELECTRICALLY CONNECTING THE PHASE SHIFTER AND THE MATCHING DEVICE

(71) Applicant: Telefonaktiebolaget LM Ericsson (publ), Stockholm (SE)

(72) Inventors: Maximilian Göttl, Frasdorf (DE); Manfred Stolle, Bad Aibling (DE); Hubert Polster, Kirchheim b. München (DE); Stephan Dandlberger, Rosenheim (DE); Josef Weber, Frasdorf (DE); Christoph Felber, Rosenheim (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 425 days.

(21) Appl. No.: 17/433,077

(22) PCT Filed: Feb. 20, 2020

(86) PCT No.: PCT/EP2020/054541
§ 371 (c)(1),
(2) Date: Aug. 23, 2021

(87) PCT Pub. No.: WO2020/169767
PCT Pub. Date: Aug. 27, 2020

(65) Prior Publication Data

US 2022/0166139 A1 May 26, 2022

(30) Foreign Application Priority Data

Feb. 22, 2019 (DE) ..................... 20 2019 101 043.6

(51) Int. Cl.
*H01P 1/18* (2006.01)
*H01Q 3/32* (2006.01)

(52) U.S. Cl.
CPC ............... *H01P 1/184* (2013.01); *H01Q 3/32* (2013.01)

(58) Field of Classification Search
CPC .... H01P 1/18; H01P 1/184; H01P 5/18; H01P 5/184

(Continued)

(56) References Cited

U.S. PATENT DOCUMENTS 7,283,015 B1 10/2007 Rockenbauch
2008/0211600 A1* 9/2008 Arderiu .................. H01P 1/182 333/161

(Continued)

FOREIGN PATENT DOCUMENTS

CN 105261835 A 1/2016
CN 107403981 B 8/2018

(Continued)

OTHER PUBLICATIONS

International Search Report and Written Opinion for International Patent Application No. PCT/EP2020/054541, mailed May 28, 2020, 14 pages.

(Continued)

*Primary Examiner* — Benny T Lee
(74) *Attorney, Agent, or Firm* — Withrow & Terranova, PLLC

(57) ABSTRACT

A phase shifter module arrangement comprises a phase shifter with a plurality of emitter connections and a central point connection. A matching network is provided. The matching network comprises a signal connection and a phase shifter connection. A separating device is provided which is electrically conductive and is arranged between the (Continued)

phase shifter and the matching network. The separating device has a first side on which the phase shifter is arranged and a second side on which the matching network is arranged. A connection opening connects the first side to the second side. The phase shifter connection of the matching network is connected electrically via the connection opening of the separating device to the central point connection of the phase shifter.

27 Claims, 5 Drawing Sheets

(58) Field of Classification Search
USPC .......................................................... 333/161
See application file for complete search history.

(56) References Cited

U.S. PATENT DOCUMENTS

| | | | |
|---|---|---|---|
| 2016/0301121 | A1 | 10/2016 | Dandlberger et al. |
| 2017/0346183 | A1 | 11/2017 | Kim et al. |

FOREIGN PATENT DOCUMENTS

| | | | |
|---|---|---|---|
| EP | 1117147 | A2 | 7/2001 |
| ES | 2310282 | T3 | 1/2009 |
| WO | 2017036339 | A1 | 3/2017 |

OTHER PUBLICATIONS

First Office Action for Chinese Patent Application No. 202080015550.4, mailed Mar. 15, 2022, 27 pages.

* cited by examiner

PHASE SHIFTER MODULE COMPRISING A DEVICE FOR PHYSICALLY SEPARATING A PHASE SHIFTER FROM A MATCHING DEVICE WHILE ELECTRICALLY CONNECTING THE PHASE SHIFTER AND THE MATCHING DEVICE

This application is a 35 U.S.C. § 371 national phase filing of International Application No. PCT/EP2020/054541, filed Feb. 20, 2020, which claims the benefit of German Application No. DE 20 2019 101 043.6, filed Feb. 22, 2019, the disclosures of which are incorporated herein by reference in their entireties.

BACKGROUND

The invention relates to a phase shifter module arrangement for use in a mobile communications antenna. Mobile communications antennae of a mobile communications site comprise a plurality of emitter elements which in the mounted state of the mobile communications antenna are preferably arranged vertically spaced apart from one another. In order to be able to vary the illumination of the mobile communications cell during operation, the mobile communications antenna could be pivoted. However, such pivoting would be mechanically complex however and error-prone. On the contrary therefore, the phase relationship between the individual emitter elements with respect to one another is varied during operation. Since some of the emitter elements receive the high-frequency communication signal to be emitted earlier than other emitter elements, a directional effect occurs. By varying this phase relationship, the area to be illuminated can be varied (emission direction of the principal lobe varies). In order to be able to vary the phase relationship, phase shifters are used which have a common connection for connection to a base station and several emitter connections for connection to the emitter elements of the mobile communications antenna. A control unit can then control the phase shifter accordingly so that the control unit changes the phase relationship at the emitter connections with respect to one another.

In order to achieve an optimal matching of the phase shifter to the mobile communications antenna (mobile communications antennae normally operate with an impedance of 50 Ohms), matching networks are used. Phase shifters and matching networks are in this case installed separately in the housing of the mobile communications antenna and wired to one another accordingly.

A disadvantage is that the installation here is complex and error-prone.

SUMMARY

It is therefore the object of the present invention here to find a better possibility to integrate a phase shifter and a matching network in a mobile communications antenna.

The object is achieved by a new type of phase shifter module arrangement. Advantageous further developments of the phase shifter module arrangement according to the invention are specified in the dependent claims.

The phase shifter module arrangement comprises a phase shifter which comprises a plurality of emitter connections for connection to different emitter elements of a mobile communications antenna. The phase shifter further comprises a central point connection, wherein the phase shifter is configured to output a high-frequency signal (e.g. mobile communications signal) which is present at the central point connection thereof to emitter connections thereof. At the emitter connections the high-frequency signal is in this case output with different phase position with respect to one another. In this case, the same polarization is present at the emitter connections. For the case that the mobile communications antenna comprises a plurality of (dual-polarized) dipoles, in each case a half of a dipole is connected to an emitter connection of the phase shifter. Then a further phase shifter which uses a second polarization (which is preferably offset by 90° with respect to the first polarization) is used.

A matching network is furthermore provided. This matching network in particular serves the purpose that the phase shifter module arrangement has a specific impedance value at the connections thereof. This is preferably 50 Ohm to avoid reflections between connection points and an associated power loss. The matching network comprises a signal connection and a phase shifter connection. At the signal connection, a high-frequency signal in a first frequency range coming from the base station (transmission signal or downlink signal) can be fed in or a high-frequency signal coming from the mobile communications antenna (reception signal or uplink signal) can be received. It will be explained subsequently that the matching network can optionally have another one or several fixed-phase connections (central system connections).

A separating device is furthermore provided which is electrically conductive and is arranged between the phase shifter and the matching network. The separating device in this case has a first side which can also be designated as a "front side". The phase shifter can be arranged on this first side or this side is facing the phase shifter. In addition to the first side, the separating device also has a second side which can also be designated as a "rear side". The matching network is arranged on this second side or the second side faces the matching network. The separating device comprises a connection opening which extends from the first side to the second side. The phase shifter connection of the matching network is connected electrically via the connection opening of the separating device (galvanically) to the central point connection of the phase shifter. Furthermore, another phase shifter cover arrangement is provided which is arranged on the first side of the separating device. A phase shifter receiving space is formed between the phase shifter cover arrangement and the separating device, in which the phase shifter is arranged. The phase shifter cover arrangement consists in particular of an electrically conductive material so that the phase shifter receiving space is shielded. Furthermore, a matching network cover arrangement is provided which is arranged on the second side of the separating device. A matching network receiving space is formed between the matching network cover arrangement and the separating device. The matching network is arranged in this matching network receiving space. The matching network cover arrangement is preferably electrically conductive so that the matching network receiving space is shielded.

It is particularly advantageous that a separating device is provided on the first side of which the phase shifter is arranged and on the second side of which the matching network is arranged. Through an opening in this electrically conductive separating device, the matching network can be directly connected to the phase shifter. A complex wiring which can introduce additional fault points is omitted. Such fault points which can occur, for example, due to incorrectly executed solder connections provide for intermodulation products (PIM). Such intermodulation products which can arise from carrier frequencies can fall within the reception frequency range of a mobile communications band. In this case, the intermodulation products would be superposed on the reception signal which has a low signal level so that the base station would have difficulties when receiving mobile communications signals.

In a further development of the phase shifter module arrangement according to the invention, the separating device consists of or comprises metal. For example, in this case it can comprise aluminium. Alternatively to this, the separating device can also be formed from a dielectric material, such as plastic for example, which is provided with an electrically conductive layer. Again alternatively to this, the separating device can also consist of or comprise plastic, wherein electrically conductive particles are integrated in the plastic. These conductive particles, which can also be designated as "grains", can for example be integrated directly in the plastic in the injection moulding process. The particular sizes in this case are preferably less than 1 mm. In this case, the separating device can be produced favourably and with a reduced weight.

In a preferred further development of the phase shifter module arrangement, the phase shifter is a difference phase shifter. Such a phase shifter comprises a plurality of arcuate strip lines. These strip lines have connections ends (on both sides) which are electrically connected to the respective emitter connections. The phase shifter also comprises a pickup which is rotatable about an axis of rotation. This pickup extends from the axis of rotation via all the arcuate strip conductors and contacts these strip lines galvanically or (preferably) capacitively. The pickup is connected galvanically or (preferably) capacitively to the central point connection in the region of an axis of rotation of the pickup. A high-frequency signal which is present at the central point connection is transmitted via the pickup to all the arcuate strip lines. However, according to the position of the pickup, this signal is present with a different phase position at the respective connection ends.

In a preferred further development of the phase shifter module arrangement, the matching network is produced in a stripline technique. The matching network is therefore a strip conductor part, wherein a first strip line extends from the signal connection of the matching network to the phase shifter connection of the matching network. The matching network is preferably a stamped sheet metal part. In principle, it can also comprise a laser-cut and/or bent part. The matching network in this case consists of a metal. The matching network can also consist of individual metal sections or metal strips. The matching network can also be constructed from a printed circuit board having corresponding structures (structured printed circuit board) or metallized plastic). Preferably however, the matching network is formed in one part. It therefore consists of a single body (e.g. a stamped part) with the result that assembly by means of solder connections is avoided.

In a preferred further development of the phase shifter module arrangement, the phase shifter connection of the matching network is soldered to the central point connection of the phase shifter. Alternatively to this, the phase shifter connection of the matching network can also be formed in one piece with the central point of the phase shifter. In this case, a bending process would be used in order to bend the central point connection with respect to the phase shifter connection so that the central point connection can be guided through the connection opening of the separating device.

In a preferred further development of the phase shifter module arrangement, the first strip line of the matching network comprises a branch line which has an open or short-circuited end. This branch line is in particular dimensioned with regard to the length thereof in such a manner that pre-determined frequencies or frequency bands can be filtered between the signal connection of the matching network and the phase shifter connection of the matching network. This means that these frequencies or frequency bands are suppressed, i.e. damped (e.g. by more than 5 dB, 10 dB, 15 dB, 20 dB or more than 25 dB). In particular, the damping should be greater than a first threshold value. The first threshold value can, for example, be 10 dB.

In a preferred further development of the phase shifter module arrangement, the matching network comprises a first central system connection for connection to a further emitter element of a mobile communications antenna. The matching network further comprises a second strip line wherein the second strip line electrically connects the first central system connection to a connection point from the first strip line. This connection point lies between the signal connection and the phase shifter connection. The further emitter element comprises in particular an emitter element of a mobile communications antenna which is surrounded by further emitter elements. This preferably comprises the emitter element at the centre of the mobile communications antenna. The phase in this emitter element is always constant in this case. This emitter element preferably emits mobile communications signals with a higher power than the surrounding emitter elements. However, this must not necessarily be the case. For this reason, the matching network comprises a corresponding central system connection.

In a preferred further development of the phase shifter module arrangement, a width of at least one part of the first strip line between the connection point and the phase shifter connection is different from a width of at least a part of the second strip line. As result of the varying resistance of the respective line, a power distribution can be achieved. As a result, it can be ensured, for example, that the signal level of the high-frequency signal which is transmitted via the second strip line is lower than the (sum) signal level of the high-frequency signal which is transmitted via the first strip line to the phase shifter connection and is then distributed at the phase shifter.

In a preferred further development, the second strip line comprises a branch line which has an open or a short-circuited end. Such a short-circuited end is also designated as a "DC ground". Induced currents, for example due to lightning strikes in the vicinity can be diverted via such a DC ground without the emitter elements of the mobile communications antenna being damaged.

In order to achieve a further tuning or a mechanical fixing of the matching network, in a further development the phase shifter module arrangement comprises a first insulating arrangement. This is located between the matching network cover arrangement and the matching network. The first insulating arrangement consists of a dielectric material and has a grid structure. Other manifestations such as, for example, individual (dielectric) support element such as pins etc. would also be feasible. In principle, a second insulating arrangement can also be provided which is constructed like the first insulating arrangement but is located between the second side of the separating device and the matching network. Dielectric elements can be clipped in, pressed in and/or latched into a (diamond-shaped) cavity of this grid structure. Depending on the selected cavities (e.g. below the first strip line or the second strip line), the matching network can be tuned accordingly.

In a preferred embodiment of the phase shifter module arrangement, a first tuning device is furthermore provided. This first tuning device comprises a dielectric tuning element and an adjusting and latching device. By means of the adjusting and latching device, the dielectric tuning element can be displaced by an adjustable length. In this case, the dielectric tuning element is preferably arranged on the first side of the separating device. The tuning element can in this case in particular be displaced over a connection line between the phase shifter connection of the matching network and the central point connection of the phase shifter (on the first side of the separating device). As a result, the phase shifter module arrangement can be tuned. In order to avoid a further (independent) displacement during operation, a latching device is provided. The first tuning device is preferably also adjustable when the phase shifter module arrangement is completely closed.

In a further preferred further development, a second tuning device is also provided. This second tuning device also comprises a dielectric tuning element and an adjusting and latching device. This adjusting and latching device again serves to displace the dielectric tuning element by an adjustable length. The dielectric tuning element is preferably displaced over a connection line (e.g. first strip line) between the signal connection of the matching network and the phase shifter connection of the matching network on the second side of the separating device. When using two tuning devices, the impedance curve of the phase shifter module arrangement can be displaced in the entire space of the Smith diagram. As a result, a complete matching of all the connections of the phase shifter module arrangement can be achieved. The second tuning device can also be actuated from outside the phase shifter module arrangement.

BRIEF DESCRIPTION OF THE DRAWINGS

Various exemplary embodiments of the invention will be described as an example hereinafter with reference to the drawings. The same items have the same reference numbers throughout the detail description of the drawings. The corresponding figures of the drawings show in detail.

DETAILED DESCRIPTION

The structure of the phase shifter module arrangement 1 according to the invention is described in detail. This phase shifter module arrangement 1 comprises a phase shifter 2 and a matching network 3 which are fastened to a common separating device 4 in such a manner that the phase shifter module arrangement 1 is obtained therefrom. This can be mounted separately and tested in advance, i.e. before mounting in a mobile communications antenna. Errors in the final mounting of the mobile communications antenna are thereby substantially reduced.

Figure 1:
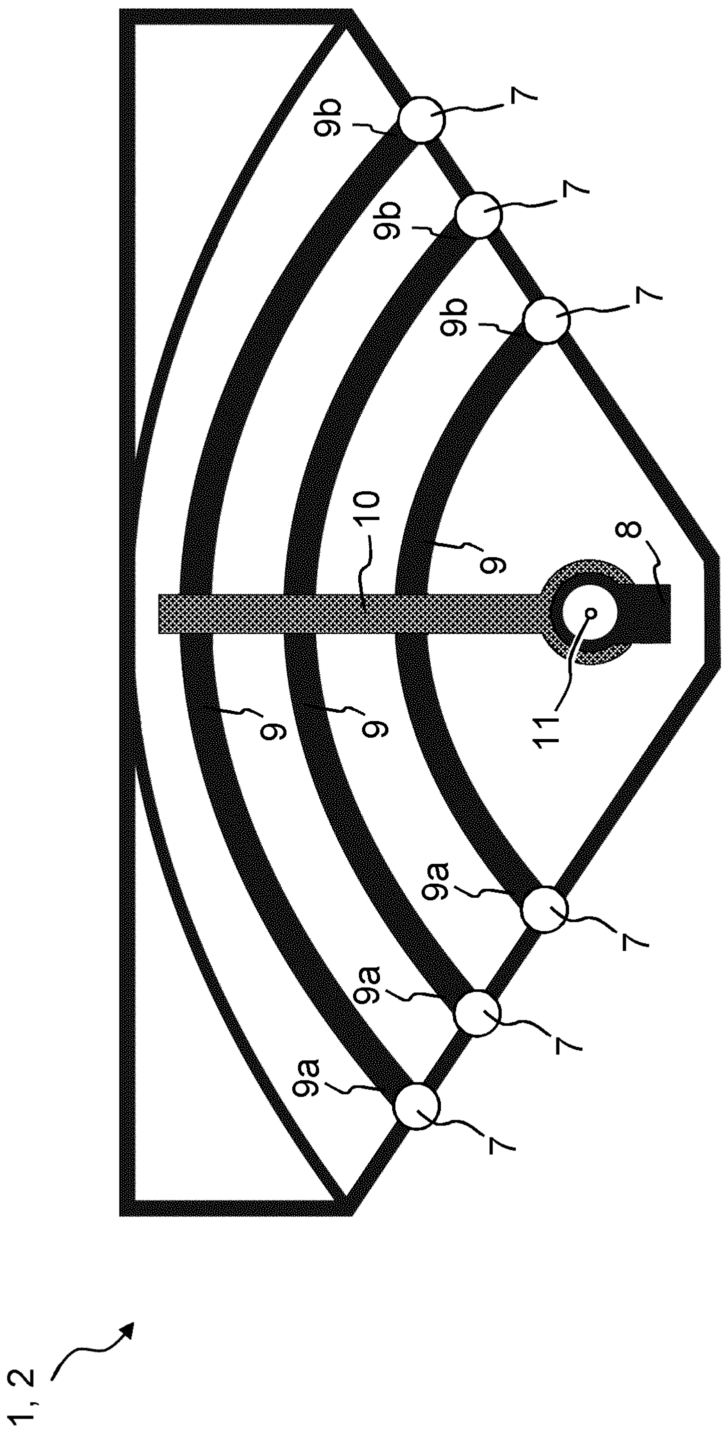
FIG. 1: shows a view of the phase shifter module arrangement with the phase shifter cover arrangement removed, which describes the structure of the phase shifter in greater detail.

FIG. 1 shows a view of the phase shifter module arrangement 1 with a phase shifter cover arrangement 5 removed (see FIG. 3) in order to explain the structure of the phase shifter 2 in greater detail.

The phase shifter 2 comprises a plurality of emitter connections 7 which are suitable for connection to various emitter elements of a mobile communications antenna. The phase shifter 2 additionally comprises a central point connection 8 and is configured to output a high-frequency signal (e.g. mobile communications signal) which is present at the central point connection 8 thereof to emitter connections 7 thereof in a phase-shifted manner. Preferably this high-frequency signal is applied to the respective emitter connections 7 in each case with a different phase.

The phase shifter 2 in FIG. 1 is a difference phase shifter. Other phase shifters can also be used. The structure of the phase shifter module arrangement will be described hereinafter for a difference phase shifter.

The phase shifter 2 comprises a plurality of arcuate strip lines 9. The arcuate strip lines 9 have connection ends 9*a*, 9*b* which are electrically connected to the respective emitter connections 7. The phase shifter 2 additionally comprises a pickup 10 which is rotatable about an axis of rotation 11. The Pickup 10 extends in this case from the axis of rotation 11 via all the arcuate strip lines 9 and contacts these strip lines galvanically or capacitively. The pickup 10 is connected galvanically or capacitively to the central point connection 8 in the region of an axis of rotation 11. Preferably capacitive connections are provided.

The arcuate strip lines 9 of the phase shifter 2 preferably extend about the same central point. The axis of rotation 11 of the pickup 10 preferably also extends through this central point of the arcuate strip lines 9. The arcuate strip lines are arranged concentrically about the axis of rotation 11.

Figure 3:
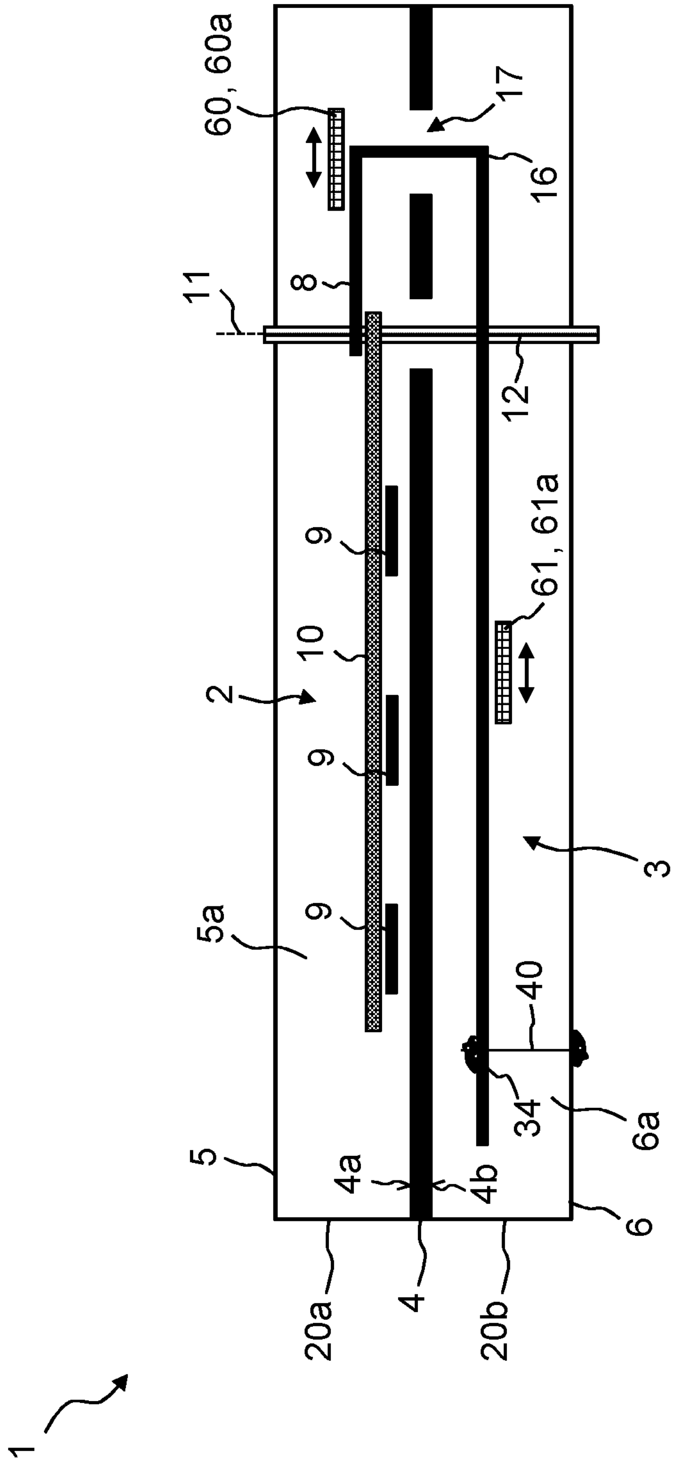
FIG. 3: shows a cross-section through the phase shifter module arrangement.

The phase shifter 2 further comprises an axial element 12. This axial element 12 is shown in FIG. 3. FIG. 3 shows a cross-section through the phase shifter module arrangement 1 according to the invention. The axial element 12 is connected; in a rotationally coupled manner to the pickup 10. The phase shifter cover arrangement 5 and a matching network cover arrangement 6 as well as the separating device 4 each comprise an opening which is penetrated by the axis of rotation 11 of the pickup 10, wherein the axial element 12 also extends through these openings. The axial element 12 can be mounted in the corresponding cover arrangements 5, 6 and/or the separating device 4. The axial element 12 can be rotated by means of a drive arrangement which, for example, can be formed by a push rod, not shown, with a gear wheel segment. A shaft with a cardan joint can also be used instead of the push rod. Other drive solutions are also feasible.

Not shown is a possible use of dielectric spacers by means of which the arcuate strip lines 9 of the phase shifter 2 are arranged at a distance from a first side 4*a* of the separating device 4. Also not shown is a possible use of dielectric spacers by means of which the arcuate strip lines 9 of the phase shifter 2 are arranged at a distance from the phase shifter cover arrangement 5.

It is also shown in FIG. 3 that the central point connection 8 of the phase shifter 2 is coupled capacitively to the pickup 10 (see air gap).

Figure 2:
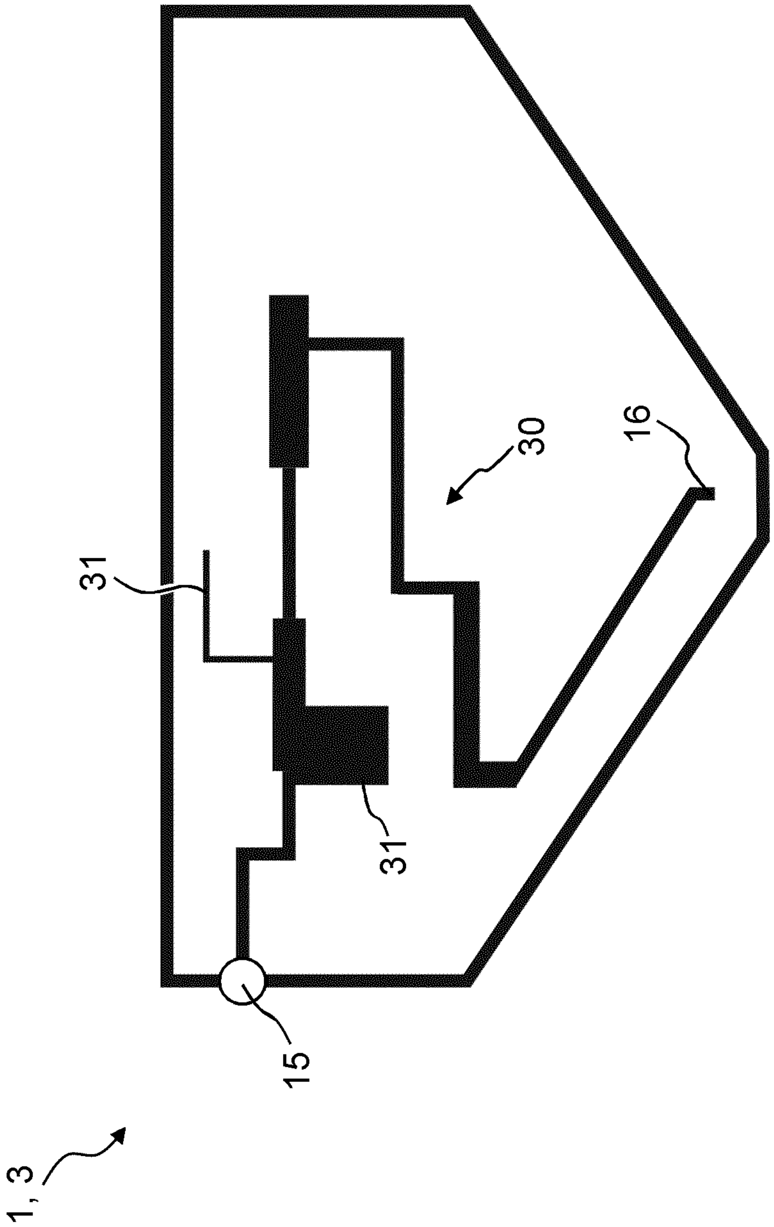
FIG. 2: shows a view of the phase shifter module arrangement with the matching network cover arrangement removed, which describes the structure of the matching network in greater detail.

FIG. 2 shows a view of the phase shifter module arrangement 1 with the matching network cover arrangement removed, with the result that the structure of the matching network 3 can be described in greater detail.

As will be explained further hereinafter, the matching network 3 comprises various functions. On the one hand, the power can be distributed between various connections. In addition, a blocking effect against specific frequencies or mobile communications bands can be provided. It is also possible that the transmission phase between a central system and the phase shifter 2 from FIG. 1 is matched by the matching network. It is also possible to match the connections to a specific impedance value. A DC ground can also be achieved.

With a view to FIG. 2, it is shown that the matching network 3 comprises a signal connection 15 and a phase shifter connection 16. With a view to FIG. 3, the separating device 4 is shown which is electrically conductive and is arranged between the phase shifter 2 and the matching network 3. The separating device 4 in this case has a first side 4*a* on which the phase shifter 2 is arranged or which is facing the phase shifter 2. The separating device 4 additionally has a second side 4*b* on which the matching network 3 is arranged or which faces the matching network 3. The separating device 4 additionally comprises a connection opening 17 which extends from the first side 4*a* to the second side 4*b*. The phase shifter connection 16 of the matching network 3 is in this case electrically connected to the central point connection 8 of the phase shifter 2 via the connection opening 17 of the separating device 4. This connection preferably comprises a galvanic connection. Preferably the phase shifter connection 16 is soldered to the central point connection 8.

FIG. 3 also shows the phase shifter cover arrangement 5 which is arranged on the first side 4*a* of the separating device 4. In this case, the phase shifter receiving space 5*a* in which the phase shifter 2 is arranged, is formed between the phase shifter cover arrangement 5 and the separating device 4.

Likewise, the matching network cover arrangement 6 which is arranged on the second side 4*b* of the separating device 4 is also shown. In this case, a matching network receiving space 6*a* in which the matching network 3 is arranged is formed between the matching network cover arrangement 6 and the separating device 4.

The first side 4*a* and the second side 4*b* of the separating device 4 are arranged opposite one another. Both sides 4*a*, 4*b* run parallel to one another.

The matching network receiving space 6*a* is preferably free from a phase shifter 2. On the other hand, the phase shifter receiving space 5*a* is preferably free from a matching network 3.

The separating device 4 consists of or comprises a metal. This results in a shielding effect between the phase shifter receiving space 5*a* and the matching network receiving space 6*a*. The separating device 4 could also be formed from a dielectric material which is provided with an electrically conductive layer. In principle, it would also be possible that the separating device 4 consists of a plastic or is comprised thereof such, wherein electrically conductive particles are integrated in the plastic.

The phase shifter cover arrangement 5 is preferably screwed to the separating device 4. A capacitive coupling or a clamping would also be possible. The same can also apply to the matching network cover arrangement 6. However, it would also be possible that the phase shifter cover arrangement 5 is screwed directly to the matching network cover arrangement 6, wherein the separating device 4 has a corresponding screw opening. By tightening the screw arrangement, the phase shifter cover arrangement 5 and the matching network cover arrangement 6 are moved towards one another and the separating device 4 is clamped between two cover arrangements 5*a*, 6*a*.

In principle, a first circumferential side wall 20*a* can be arranged between the first side 4*a* of the separating device 4 and the phase shifter cover arrangement 5. The emitter connections 7 of the phase shifter 2 from FIG. 1 are then preferably arranged on this first circumferential side wall 20*a*.

A second circumferential side wall 20*b* can also be arranged between the second side 4*b* of the separating device 4 and the matching network cover arrangement 6. The signal connection 15 of the matching network 3 can then be arranged on this second circumferential side wall 20*b*.

A possible structure of the matching network 3 will be described in detail hereinafter with a view to FIG. 2. The matching network 2 is preferably formed in a stripline technique. This comprises a first strip line 30 which extends from the signal connection 15 to the phase shifter connection 16. This first strip line 30 consists of or comprises metal and is preferably formed in one part. This applies further preferably to the entire matching network 3. In principle, the matching network 3 can also consist of various metal sections or metal strips which are joined together, in particular soldered together.

The first strip line 30 of the matching network 3 preferably comprises at least one branch line 31 (two branch lines of different thickness are shown in FIG. 2). This at least one branch line 31 comprises an open end in this exemplary embodiment. However, the end could also be short-circuited, to which reference will be made subsequently. The at least one branch line 31 is dimensioned with regard to the length thereof in such a manner that pre-determined frequencies or frequency bands are damped, i.e. filtered between the signal connection 15 and the phase shifter connection 16. The branch lines 31 are also used for impedance transformation.

This branch line 31 can however also be short-circuited at the open end thereof. Such a short-circuiting preferably takes place towards the phase shifter cover arrangement 6.

The matching network 3 is preferably configured as a stamped and/or laser-cut and/or bent part. The matching network 3 can also be constructed from a printed circuit board with corresponding structures (structured printed circuit board) or metallized plastic or comprise these.

Figure 4A:
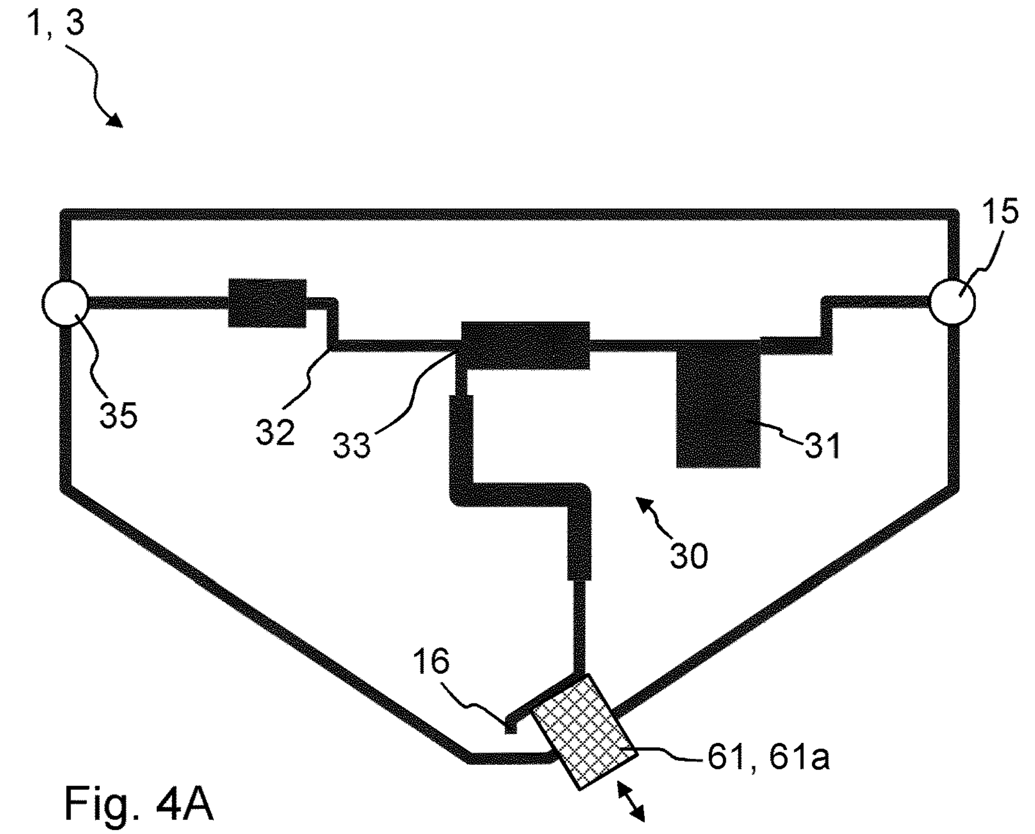
FIGS. 4A, 4B, 4C: show various exemplary embodiments of the matching network.
Figure 4B:
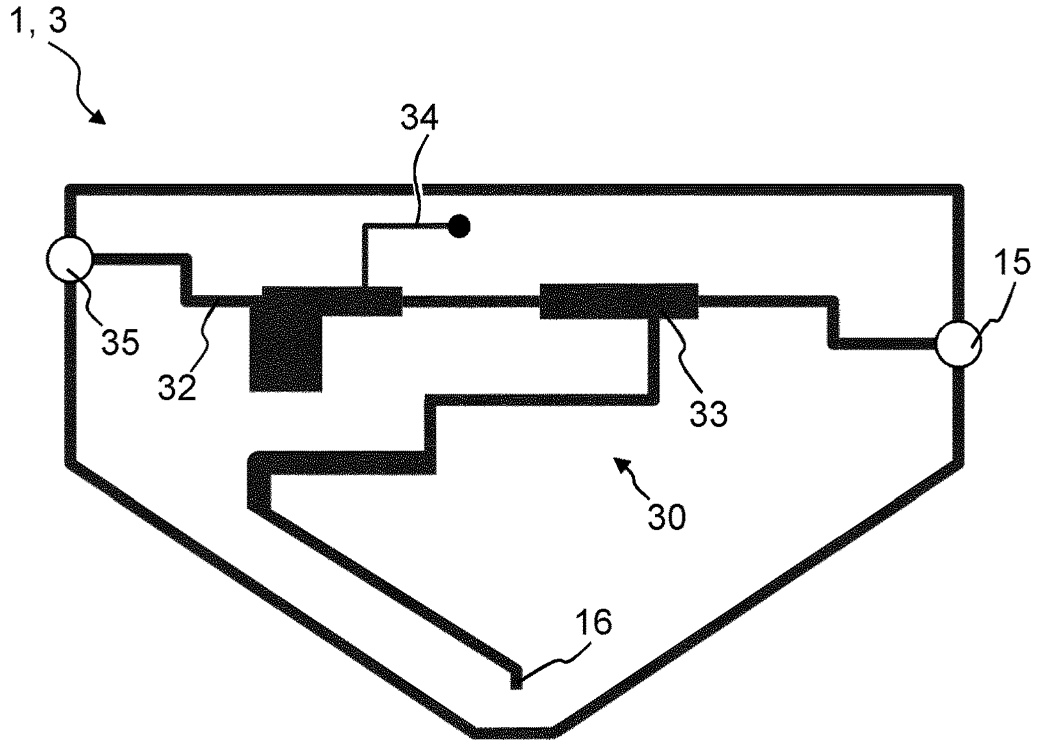
Figure 4C:
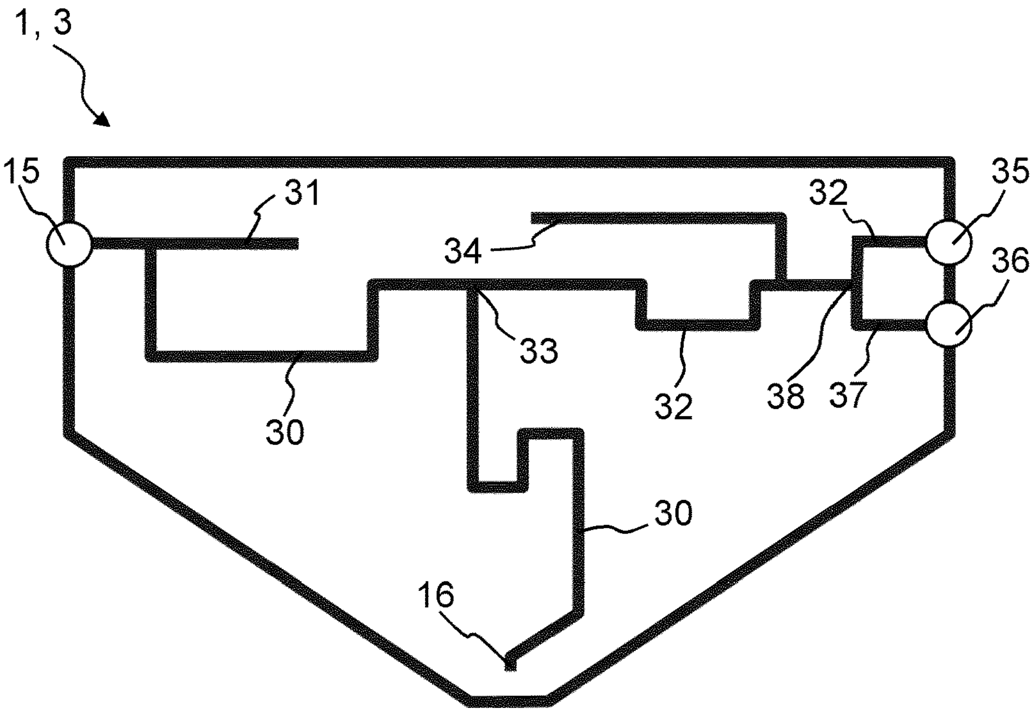

Further exemplary embodiments of the matching network 3 are described with a view to FIGS. 4A, 4B and 4C.

In FIGS. 4A and 4B, the matching network 3 also comprises a first central system connection 35. This is used for connection to a further emitter element of a mobile communications antenna. This further emitter element preferably comprises an emitter element in the centre of the mobile communications antenna. In this case, the matching network 3 comprises a second strip line 32. The second strip line 32 connects the first central system connection 35 to a connection point 33 on the first strip line 30. This connection point 33 lies between the signal connection 15 and the phase shifter connection 16. This connection comprises an electrical connection. Both strip lines 30, 32 are preferably constructed in one part. These strip lines therefore further preferably consist of a common stamped and/or laser-cut part.

It is also shown that the width of at least one part of the first strip line 30 between the connection point 33 and the phase shifter connection 16 is different from a width of at least one part of the second strip line 32. As a result, a power distribution can be achieved. The level of the high-frequency signal which is output at the central system connection 35 and at the phase shifter connect 16 can thus be different. Instead of an increased width, it is also possible to talk of a thickening, wherein this preferably only takes place two-dimensionally, i.e. in one plane.

The matching network 3 preferably extends only in one plane.

The strip lines 30, 32 extend parallel to the separating device 4 and furthermore parallel to the arcuate strip lines 9 of the phase shifter 2 as shown in FIG. 1.

It is shown in FIG. 4B that the second strip line comprises another branch line 34, the end of which is short-circuited (black point). The end could also be open-circuited. Due to a short-circuit, a DC ground is provided with the result that induced currents which, for example, are caused by neighbouring lightning strikes are diverted. The further branch line 34 also serves to achieve a correction of the transmission phase. This means that with a fixed setting of the phase shifter 2 between the emitter connections 7 as shown in FIG. 1 and the first central system connection 35 over the frequency range in which the phase shifter module arrangement 1 is operated, the phase shift is constant.

The structure of a short-circuit connection is shown, for example, in FIG. 3. Thus, a conducting connection 40 which can, for example, comprise a solder pin is used to connect a part of the matching network 3 (in this case, the further branch line 34) to a reference (in this case, the housing). The end of the further branch line 34 which originates at the second strip line 32 is in this case soldered to the matching network cover arrangement 6. The conducting connection 40 can also be connected in one piece to the matching network 3. A part of the matching network 3 can be bent in the direction of the matching network cover arrangement 6 and can be galvanically connected to this, e.g. soldered.

Figure 5A:
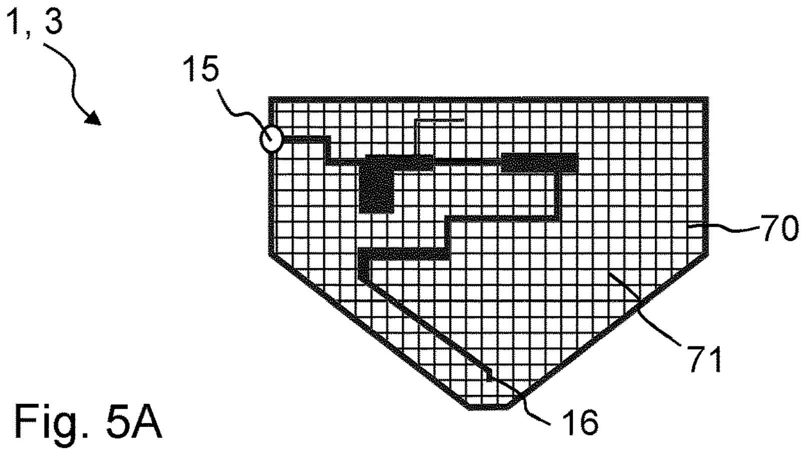
FIG. 5A: shows a view of an exemplary embodiment of an inner side of the matching network cover arrangement.
Figure 5B:
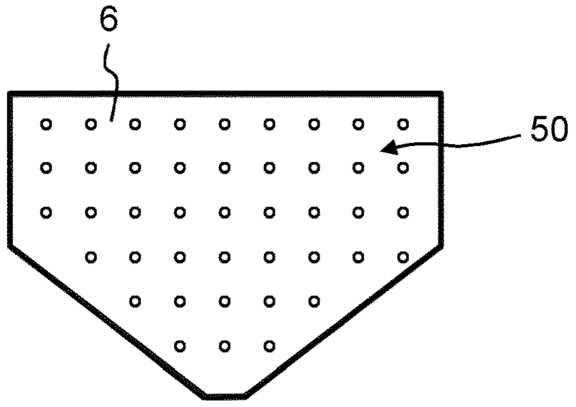
FIG. 5B: shows a view of an exemplary embodiment of an outer side of the matching network cover arrangement.

With a view to FIG. 5B it is shown that the matching network cover arrangement 6 comprises a hole pattern 50. This hole pattern 50 consists of a plurality of openings. These openings can in this case be less than $\lambda/10$ of the high-frequency signal which is supplied or received at the signal connection in FIG. 4C. The conducting connection (e.g. solder pin) 40 from FIG. 3 is in this case guided through a suitable opening of the hole pattern 50 and is soldered both to the matching network cover arrangement 6 and also in the corresponding part of the matching network 3 in FIG. 3, i.e. to the branch line 34 of the second strip line 32 from FIG. 4C.

The hole pattern 50 is preferably regular and therefore symmetrically constructed. This means that the spacing of the individual openings with respect to one another is (approximately) the same.

It is further shown in FIG. 4C that the matching network 3 also comprises a second central system connection 36. This is also used for connection to a further emitter element of the mobile communications antenna. There is preferably no phase offset between the first and the second central system connection 35, 36. However, this phase offset could also be set, e.g. by cables of different length which are connected to the central system connections 35, 36. The further emitter elements are preferably those in the centre of the mobile communications antenna. In FIG. 4C the matching network 3 also comprises a third strip line 37. The third strip line 37 connects (electrically) the second central system connection 36 to a connection point on the first strip line 30, wherein the connection point lies between the signal connection 15 and the phase shifter connection 16. This can be the same connection point 33 at which the second strip line 32 is connected to the first strip line 30. However, it can also comprise a further connection point which is spaced apart from the first connection point 33. However, it is shown in FIG. 4C that the third strip line 37 connects the second central system connection 36 to a further connection point 38 which lies on the second strip line 32, wherein the further connection point 38 lies between the connection point 33 on the first strip line and the first central system connection 35.

In order to be able to suitably match the matching network 3, a first tuning device 60 and a second tuning device 61 are shown with a view to FIG. 3. The first tuning device 60 in this case comprises a dielectric tuning element 60*a*. The first tuning device 60 also comprises an adjusting and latching device (not shown) in order to be able to displace the dielectric tuning element 60*a* by a pre-determined (adjustable) length over a connecting line between the phase shifter connection 16 of the matching network 3 and the central point connection 8 of the phase shifter 2 on the first side 4*a* of the separating device 4. The phase shifter module arrangement 1 can thereby be tuned. The adjusting and latching device can, for example, be formed by means of a knurl. In this case, the first tuning device 60 is accessible and adjustable from outside, i.e. when the phase shifter cover arrangement 5 is closed.

The same applies to the second tuning device 61. This also comprises a dielectric tuning element 61*a* and an adjusting and latching device (not shown). By means of the adjusting and latching device, the dielectric tuning element 61*a* can be displaced by an adjustable length over a connecting line between the signal connection 15 of the matching network 3 and the phase shifter connection 16 of the matching network 3 on the second side 4*b* of the separating device 4. Preferably the dielectric tuning element 61*a* of the second tuning device 61 is arranged between the connection point 33 on the first strip line 30 and the phase shifter connection 16. The second tuning device 61 is preferably also adjustable from outside the phase shifter module arrangement 1. In particular, the second tuning device 61 is accessible when the phase shifter cover arrangement 6 is closed.

By using these tuning devices 60, 61, a tuning can be achieved on the phase shifter side and matching network side. It is thereby ensured that the input resistances (impedances) at the respective connections (e.g. signal connection 15) preferably correspond to 50 Ohm.

By means of the tuning devices 60, 61, the impedance curve in the Smith chart for the phase shifter side and the matching network side can be set in all directions.

FIG. 5A also shows a view of an exemplary embodiment of an inner side of the matching network cover arrangement 6. A first insulating arrangement 70 which consists of a dielectric material from FIG. 5B is arranged between the matching network cover arrangement 6 and the matching network 3. This first insulating arrangement 70 has a grid structure. The grid structure comprises cavities 71. Dielectric elements can be clipped in or pressed in or latched into these cavities of the grid structure. By this means the matching network 3 can also be tuned. The grid structure is preferably configured to be regular and in particular has a diamond shape or a square shape. In principle, the shape is arbitrary. The size of the cavities 71 can be suitably selected in precisely the same way. Depending on where the matching network 3 is arranged, the corresponding cavity 71 can be filled with a corresponding dielectric element if required. The matching network 3 then rests on this first insulating arrangement 70.

Additionally or alternatively a second insulating arrangement (not shown) can be arranged between the second side 4*b* of the separating device 4 and the matching network 3. This can also consist of a dielectric material or comprise such, wherein the second insulating arrangement can also have a grid structure. A dielectric element can also be clipped in, pressed in and/or latched into this grid structure of the second insulating arrangement to tune the matching network 3.

A mobile communications antenna could also be claimed comprising at least one or at least two of the described phase shifter module arrangements 1. The at least one phase shifter module arrangement 1 would preferably be arranged within the mobile communications antenna housing but could also be arranged outside of the mobile communications antenna housing. The mobile communications antenna also comprises a plurality of emitter elements (e.g. each of them could be used in two polarizations) connected to the phase shifter 2 of the at least one phase shifter module arrangement 1.

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

The invention claimed is:

1. A phase shifter module arrangement for use in a mobile communications antenna having the following features:

a phase shifter is provided;

the phase shifter comprises a plurality of emitter connections for connection to different emitter elements of a mobile communications antenna;

the phase shifter comprises a central point connection, wherein the phase shifter is configured to output a high-frequency signal which is present at the central point connection thereof to emitter connections thereof;

a matching network is provided;

the matching network comprises a signal connection and a phase shifter connection;

a separating device is provided which is electrically conductive and is arranged between the phase shifter and the matching network wherein the separating device consists of or comprises metal; or the separating device is formed from a dielectric material which is provided with an electrically conductive layer; or the separating device consists of or comprises plastic, wherein electrically conductive particles are integrated in the plastic;

the separating device has a first side on which the phase shifter is arranged or which is facing the phase shifter and a second side on which the matching network is arranged or which faces the matching network;

the separating device comprises a connection opening which extends from the first side to the second side;

the phase shifter connection of the matching network is connected electrically via the connection opening of the separating device to the central point connection of the phase shifter;

a phase shifter cover arrangement is provided which is arranged on the first side of the separating device, wherein a phase shifter receiving space is formed between the phase shifter cover arrangement and the separating device, in which the phase shifter is arranged;

a matching network cover arrangement is provided which is arranged on the second side of the separating device, wherein a matching network receiving space is formed between the matching network cover arrangement and the separating device in which the matching network is arranged.

2. The phase shifter module arrangement according to claim 1, characterized by the following feature:

the first side of the separating device is arranged opposite the second side of the separating device.

3. The phase shifter module arrangement according to claim 1, characterized by the following features:

the phase shifter cover arrangement is screwed to the separating device and the matching network cover arrangement is screwed to the separating device; or the phase shifter cover arrangement is screwed to the matching network cover arrangement, wherein the separating device is clamped between the phase shifter cover arrangement and the matching network cover arrangement.

4. The phase shifter module arrangement according to claim 1, characterized by the following feature:

the phase shifter is a difference phase shifter.

5. The phase shifter module arrangement according to claim 1, characterized by the following features:

the phase shifter comprises a plurality of arcuate strip lines;

the plurality of arcuate strip lines have connections ends which are electrically connected to the respective emitter connections;

the phase shifter comprises a pickup which is rotatable about an axis of rotation;

the pickup extends from the axis of rotation towards all of the arcuate strip conductors and contacts the arcuate strip conductors galvanically or capacitively;

the pickup is connected galvanically or capacitively to the central point connection in a region of the axis of rotation.

6. The phase shifter module arrangement according to claim 5, characterized by the following features:

the phase shifter comprises an axial element;

the axial element is connected to the pickup;

the phase shifter cover arrangement and, the matching network cover arrangement each comprise an opening which is penetrated by the axis of rotation of the pickup, wherein the axial element extends through these openings and the connection opening.

7. The phase shifter module arrangement according to claim 5, characterized by the following features:

the arcuate strip lines of the phase shifter extend around a centre point;

the axis of rotation of the pickup extends through the centre point of the arcuate strip lines.

8. The phase shifter module arrangement according to claim 1, characterized by the following feature:

a first circumferential side wall is arranged between the first side of the separating device and the phase shifter cover arrangement;

the emitter connections of the phase shifter are arranged on the first circumferential side wall.

9. The phase shifter module arrangement according to claim 1, characterized by the following feature:

the matching network is a strip conductor part, wherein a first strip line extends from the signal connection of the matching network to the phase shifter connection of the matching network.

10. The phase shifter module arrangement according to claim 9, characterized by the following feature:

the matching network is a stamped and/or laser-cut and/or bent part and/or a structured printed circuit board and/or a metallized plastic.

11. The phase shifter module arrangement according to claim 9, characterized by the following feature:

the matching network consists of or comprises metal, metal sections and/or metal strips.

12. The phase shifter module arrangement according to claim 9, characterized by the following feature:

the matching network is formed in one part.

13. The phase shifter module arrangement according to claim 9, characterized by the following feature:

the phase shifter connection of the matching network is soldered to the central point connection of the phase shifter; or the phase shifter connection of the matching network is formed in one piece with the central point connection of the phase shifter.

14. The phase shifter module arrangement according to claim 9, characterized by the following feature:

the first strip line of the matching network comprises at least one branch line with an open-circuited or short-circuited end, wherein the at least one branch line is dimensioned with regard to the length thereof in such a manner that pre-determined frequencies or frequency bands can be filtered between the signal connection of the matching network and the phase shifter connection of the matching network.

15. The phase shifter module arrangement according to claim 9, characterized by the following features:

the matching network comprises a first central system connection for connection to a further emitter element of a mobile communications antenna;

the matching network comprises a second strip line;

the second strip line connects the first central system connection to a connection point from the first strip line, wherein the connection point lies between the signal connection and the phase shifter connection.

16. The phase shifter module arrangement according to claim 15, characterized by the following feature:

a width of at least one part of the first strip line between the connection point and the phase shifter connection is different from a width of at least a part of the second strip line with the result that a high-frequency signal at the phase shifter connection has a different power level than at the first central system connection.

17. The phase shifter module arrangement according to claim 15, characterized by the following feature:

the second strip line comprises a branch line with an open-circuited or short-circuited end.

18. The phase shifter module arrangement according to claim 17, characterized by the following feature:

the end of the branch line which originates at the second strip line is soldered to the matching network cover arrangement.

19. The phase shifter module arrangement according to claim 18, characterized by the following features:

the matching network cover arrangement comprises a hole pattern wherein a conducting connection is guided through an opening of the hole pattern and wherein the conducting connection is galvanically connected to the matching network cover arrangement and to the end of the branch line which originates at the second strip line;

the openings of the hole pattern are less than $\lambda/10$ of the high-frequency signal at the signal connection.

20. The phase shifter module arrangement according to claim 19, characterized by the following feature:

the conducting connection is formed from a part of the matching network.

21. The phase shifter module arrangement according to claim 15, characterized by the following features:

the matching network comprises a second central system connection for connection to a further emitter element of a mobile communications antenna;

the matching network comprises a third strip line;

the third strip line connects the second central system connection to:

a) a connection point on the first strip line, wherein the connection point lies between the signal connection and the phase shifter connection;

b) a further connection point on the second strip line, wherein the further connection point lies between the connection point on the first strip line and the first central system connection.

22. The phase shifter module arrangement according to claim 1, characterized by the following feature:

located between the matching network cover arrangement and the matching network is a first insulating arrangement which comprises of a dielectric material, wherein the first insulating arrangement comprises a grid structure; and/or located between the second side of the separating device and the matching network is a second insulating arrangement which comprises of a dielectric material, wherein the second insulating arrangement comprises a grid structure.

23. The phase shifter module arrangement according to claim 1, characterized by the following features:

a second circumferential side wall is arranged between the second side of the separating device and the matching network cover arrangement;

the signal connection of the matching network is arranged on the second circumferential side wall.

24. The phase shifter module arrangement according to claim 1, characterized by the following feature:

a first tuning device is provided; and the first tuning device comprises a dielectric tuning element.

25. The phase shifter module arrangement according to claim 24, characterized by the following feature:

the first tuning device is accessible from outside the phase shifter cover arrangement and from outside the matching network cover arrangement.

26. The phase shifter module arrangement according to claim 1, characterized by the following feature:

a second tuning device is provided;

the second tuning device comprises a dielectric tuning element;

the second tuning device comprises an adjusting and latching device in order to displace the dielectric element by an adjustable length over a connection line between the signal connection of the matching network and the phase shifter connection of the matching network on the second side of the separating device, with the result that the phase shifter module arrangement can be tuned.

27. The phase shifter module arrangement according to claim 26, characterized by the following feature:

the second tuning device is accessible from outside the phase shifter cover arrangement and from outside the matching network cover arrangement.

* * * * *